W. HEATON.
Fruit Drier.
No. 19,635.
Patented March 16, 1858.
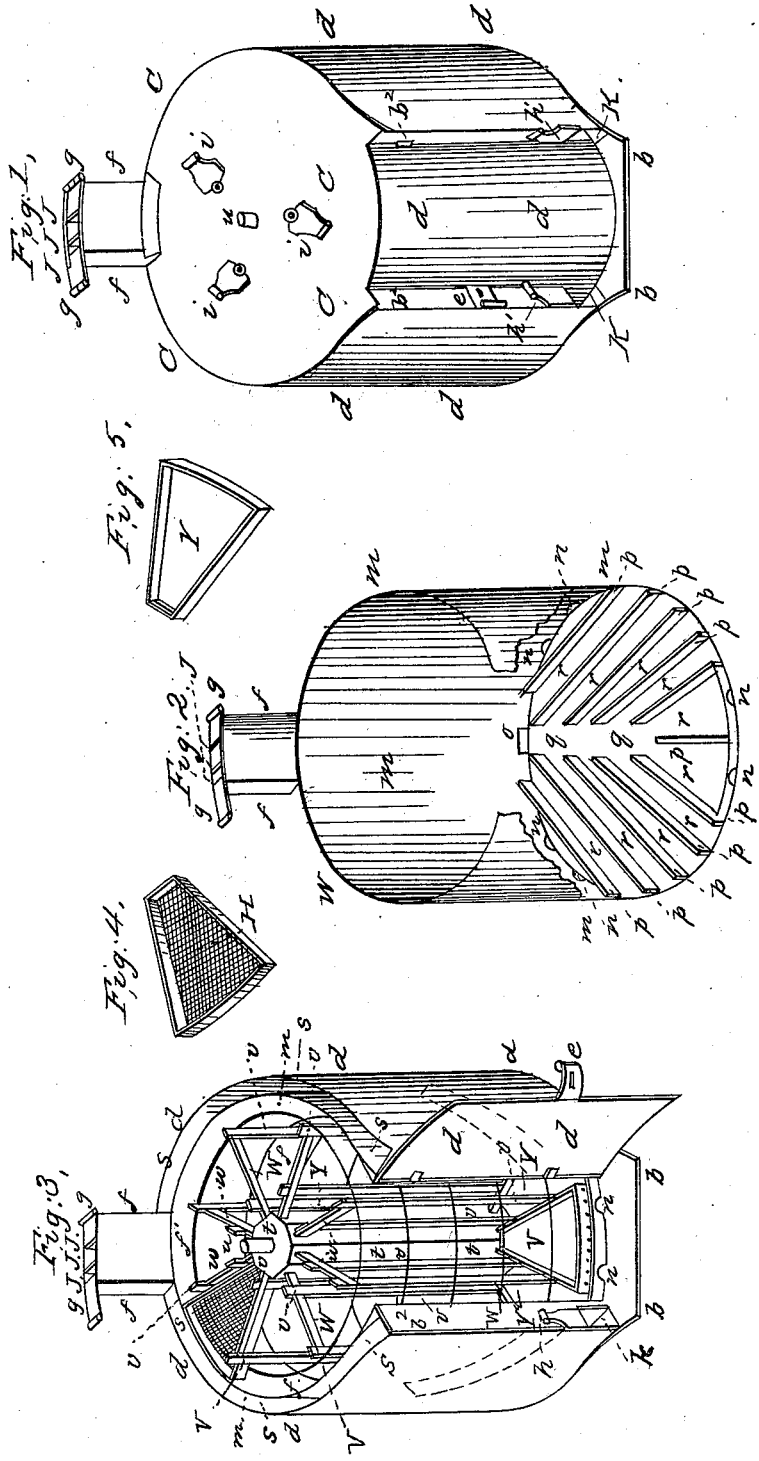

UNITED STATES PATENT OFFICE.

WILLIAM HEATON, OF GREEN COUNTY, PENNSYLVANIA.

APPARATUS FOR DRYING FRUIT.

Specification of Letters Patent No. 19,635, dated March 16, 1858.

*To all whom it may concern:*

Be it known that I, WILLIAM HEATON, of the county of Green, in the State of Pennsylvania, have invented and made certain new and useful Improvements in Apparatus or Houses for the Drying of Fruit and for other Purposes; and I do hereby declare that the following is a full, clear, and exact description thereof, reference being had to the accompanying drawings, making a part of this specification, in which—

Figure 1, is a perspective view of the apparatus complete; $a, a, a, a$, the outside of the apparatus. Fig. 2, shows the inside apartment, detached, and partly in section. Fig. 3, shows the internal arrangement of the apparatus. Fig. 4, shows one of the drying pans, or sieve like vessels. Fig. 5, shows one of the solid bottom drying pans or vessel.

To enable others to construct, and use my improvements, I describe the same as follows, viz.

I construct an outside casing, of iron, stone or brick, of any suitable dimensions and required form, that, shown in Fig. 1, being found the most convenient, and being of a circular form, as at $a, a, a, a$, being built on a fire proof base or flooring $b, b$. This outside structure, or main wall casing extends around nearly to a complete circle, when at the interval of about six feet, (more or less), the casing or wall flares outward from the circle, forming projections or offsets, $b^2, b^2$, and flaring obliquely and extending outward about three feet. In the face or front of these projections, are formed fire places, or openings $k, k$, with suitable doors, or damper slides $h^1, h^1$. After the outer casing or wall, is complete, an interior, or inside, casing is constructed similar to the outer one and about four feet less in diameter, as at $m, m, m, m$, Fig. 2, so as to form a space or hot air, and smoke flue, $s, s, s, s$, Fig. 3. The interior casing or wall $m, m, m, m$, buts up or connects closely with the offsets $b^2, b^2$, and thus leaving a doorway, or opening, as shown at $d, d$, Fig. 1. By reference to Fig. 3, the two casings are distinctly shown with the opened door $d, d$. Around the base circumference of the inner casing, at proper intervals, are formed small arches or hot air vents, as at $n, n, n, n$, and directly in the back part in a direct line from the front is a draft vent O, (Fig. 2) and this vent O communicates directly with a vertical flue proceeding upward, toward the top of the casings or walls and terminating in a compound register chimney $f, f$, formed with three exit flues J, J$^2$, J, supplied with two sliding valve dampers or shutoffs $g, g$, Figs. 1, 2, 3. The rows of dotted lines show sloping flues, proceeding from the fire places $k, k$. Upon the base or flooring part of the interior casing are formed, between each air vent $n, n$, of any suitable material, fire proof joists P, P, P, P, P, P, about two feet high (more or less) and these joists proceed obliquely tending inward, toward each other; their inmost ends terminating within one or two feet of each other thus forming a main center hot air draft channel or flue $q, q$, and branch hot air drafts or inner flues or heating cells $r, r, r, r, r, r$, as shown in sectional diagram or Fig. 2. Over these joists, a suitable flooring of fire proof materials is to be formed, as at $y^4, y^4$, in Fig. 3. Upon the whole superstructure, is formed a top or flooring of metal, or fire proof material, and having valve vapor vents, or escapes, I, I, I, as in Fig. 1. In the center of this flooring is formed a socket, or step of metal and into which is to work, a vertical shaft, or column $t, t$, (with spindle end $u$) as shown in Fig. 3, of about twelve inches diameter, and formed of octagon shape, and of suitable height, or length. This shaft is provided with eight horizontal arms, above and below, near each end, as at $w, w, w, w, w, w, w, w, w$, Fig. 3.

The arms may extend inwardly toward the side of the casing and within, about ten or twelve inches thereof. To these series of arms, are attached in any suitable manner two or more vertical rails $v, v, v, v, v, v$, shown in Fig. 3, and presenting in appearance a device similar to an inverted reel, shown in Fig. 3. The upper extremity of which reel has a journal or pivot end, which may work in a socket attached to the top, or the pivot end may extend entirely through the top as shown in Fig. 1. Around the rails $v, v, v, v$, of the reel, at equal distances are stout wires, or rest rails &, &, &, designed to answer as shelving supports and upon them may be placed drying pans or shelves, in shape, like $x, y$, Figs. 3, 4, 5, formed with perforated or sieve like bottoms as at $x$ or solid bottoms as at $y$, Figs. 4, 5.

It may be well enough to remark, that if desired, my drying house or apparatus may be made of two or more stories in height, and with compartments for drying various substances, other than fruit, at one and the same time. The operation of my drying house or apparatus is, as follows viz:—Fire is kindled up in the fire chambers $k$, $k$, with dry wood fuel and the slides or valves $h^1$, $h^1$, opened or shut when desired to increase or decrease the draft. The cut fruit is to be deposited upon the several tiers of drying pans, arranged upon the wires or resting rails, and as the reellike device is horizontally rotating, each series of pans, or drying vessels, can be readily supplied with the fruit; for all that is necessary, is for a person to stand in the doorway of the apparatus, and as one tier is filled the reel is pushed around by the hand, and thus, shelf, after shelf or tier after tier may be readily supplied with the fruit. Either the empty drying pans may be put into the reel, or they may be supplied outside first, and the pan with the fruit deposited in the proper place, after which the door $d$, $d$, must be closed. The degree of temperature, can be most readily regulated, by closing down the valves or slides $h^1$, $h^1$. The center flue of the chimney is the smoke escape, and the outside ones, are hot air flues, and by opening or closing them, the degree of temperature may be diminished or increased when required. The closing of the valves or slides $g$, $g$ diverts the hot air currents and causes them to encompass more rapidly the inner casing or apartment $m$ $m$ $m$ $m$, and also descending, enters the several archways or openings $n$ $n$ $n$ $n$ $n$ and diffuses throughout the interior space, and operates gradually and most effectively. Should a very large quantity of fruit be deposited, and a large volume of heat be required, additional fires, may be built immediately in the front part of the apparatus, in the smaller fire places.

In the event of the gree fruit throwing off an excess of moisture, the vapor valves or vents I, I, I, must be opened, when the moisture can pass out, rapidly diffusing and expanding above, and thus preventing any tendency to the "sweating" of the fruit. These valves or vents shown at I I I, Fig. 1, are made either to work on a pivot joint, or may be hinged to raise like a trap door.

The advantages of my improvements, are, that, with a small supply of fuel, a large quantity of fruit may be most effectually dried, in twenty four hours, or in about one fourth the usual time required by exposure to the common atmosphere. Besides the importance and great utility of my mode of preparing dried fruit are of no little consideration, for, in all other modes resorted to, it has been found impossible, to prevent the great evaporation or extracting by the atmospheric action of the juicy, sweet property, as well as the watery matter, and in this peculiar process of common atmospheric action, an acidity and insipidity of taste is imparted to the fruit materially impairing the quality thereof, as well as also reducing the nutritive principle or property of the fruit. Again too, the common atmospheric system of drying fruit, discolors it, and renders it liable to be affected by extraneous substances or matter, dust and mildew. But through means of my mode all the said objections and injurious effects are entirely overcome, as my repeated experiments, and experience, have demonstrated. The quality of the fruit, dried by my mode is vastly superior to fruit dried in any manner heretofore resorted to, as all the natural flavor and the saccharine principle are preserved, and in addition thereto, a greater amount of substance is retained, together with greater cleanliness and freedom from dirt, dust, and other injurious, and objectionable, consequences arising in the ordinary system of fruit drying, and to overcome all of which has been long an important desideratum to the producer and consumer.

Having shown the form and general construction of my fruit drying apparatus or house, and having given a full, clear, and exact description thereof, what I claim as new and original and desire to have secured by Letters Patent of the United States is as follows:

1. I am well aware that hot air vents, flues, heating cells and vapor vents have been used, and therefore singly in themselves I disclaim all such devices, but I claim the construction of a fruit drying apparatus, when formed with an inner casing or chamber $m$, $m$, $m$, $m$, having series of hot-air vents $n$, $n$, $n$, $n$,—series of hot air flues or heating cells $r$, $r$, $r$, as in Fig. 2, with the compound register chimney $f$, $f$, formed with a smoke flue O, $J^2$ and hot air exit flues J, J, and vapor vents or escapes I I when arranged and used substantially as described.

2. I am also aware that rotating reels and drying sieves and pans have been employed singly for various purposes, and as individual devices I do not claim them, but I claim the revolving or rotating drying reel $t$, $u$, $v$, $w$—the drying sieves $x$, $x$, and pans $y$, $y$, when used in arrangement with the casing, vents, flues, cells, register chimney, smoke flue, exit flues, and vapor escapes in the manner, and for the purposes set forth.

WM. HEATON. [L. S.]

Witnesses:
WM. S. HOLLINGSHEAD,
R. S. MIDDLETON.